United States Patent [19]

Jones

[11] Patent Number: 5,243,782
[45] Date of Patent: Sep. 14, 1993

[54] CHRISTMAS TREE WATERING APPARATUS

[76] Inventor: Shawnee L. Jones, 5480 Copper Canyon, Yorba Linda, Calif. 92687

[21] Appl. No.: 877,794

[22] Filed: May 4, 1992

[51] Int. Cl.$^5$ ............................ A47G 7/02; A47G 33/12
[52] U.S. Cl. ...................................... 47/40.5; 47/48.5
[58] Field of Search ................. 47/40.5, 25, 32, 48.5, 47/33

[56] References Cited

U.S. PATENT DOCUMENTS

| | | | |
|---|---|---|---|
| D. 278,075 | 3/1985 | Dryden | 47/48.5 |
| 2,784,528 | 3/1957 | Rudenauer | 47/48.5 |
| 2,909,328 | 10/1959 | Babyak | 47/33 |
| 2,969,185 | 1/1961 | Geiger | 47/48.5 |
| 3,697,026 | 10/1972 | Hambrick | 47/40.5 |
| 3,865,309 | 2/1975 | Greenhalgh | 47/33 |
| 4,930,252 | 6/1990 | Krause et al. | 47/40.5 |

FOREIGN PATENT DOCUMENTS

| | | | |
|---|---|---|---|
| 514178 | 6/1930 | Fed. Rep. of Germany | 47/48.5 |
| 3701057 | 8/1987 | Fed. Rep. of Germany | 47/40.5 |

*Primary Examiner*—Richard E. Chilcot, Jr.
*Assistant Examiner*—Joanne C. Downs
*Attorney, Agent, or Firm*—Leon Gilden

[57] ABSTRACT

A Christmas tree fluid control housing includes a first valve and second valve in communication with a first conduit, wherein the first valve selectively directs water flow to a sprinkling ring mounted adjacent an upper distal end of an associated Christmas tree, with a misting ring mounted in surrounding relationship relative to the sprinkling ring operative through a timer mechanism within the fluid control housing.

5 Claims, 4 Drawing Sheets

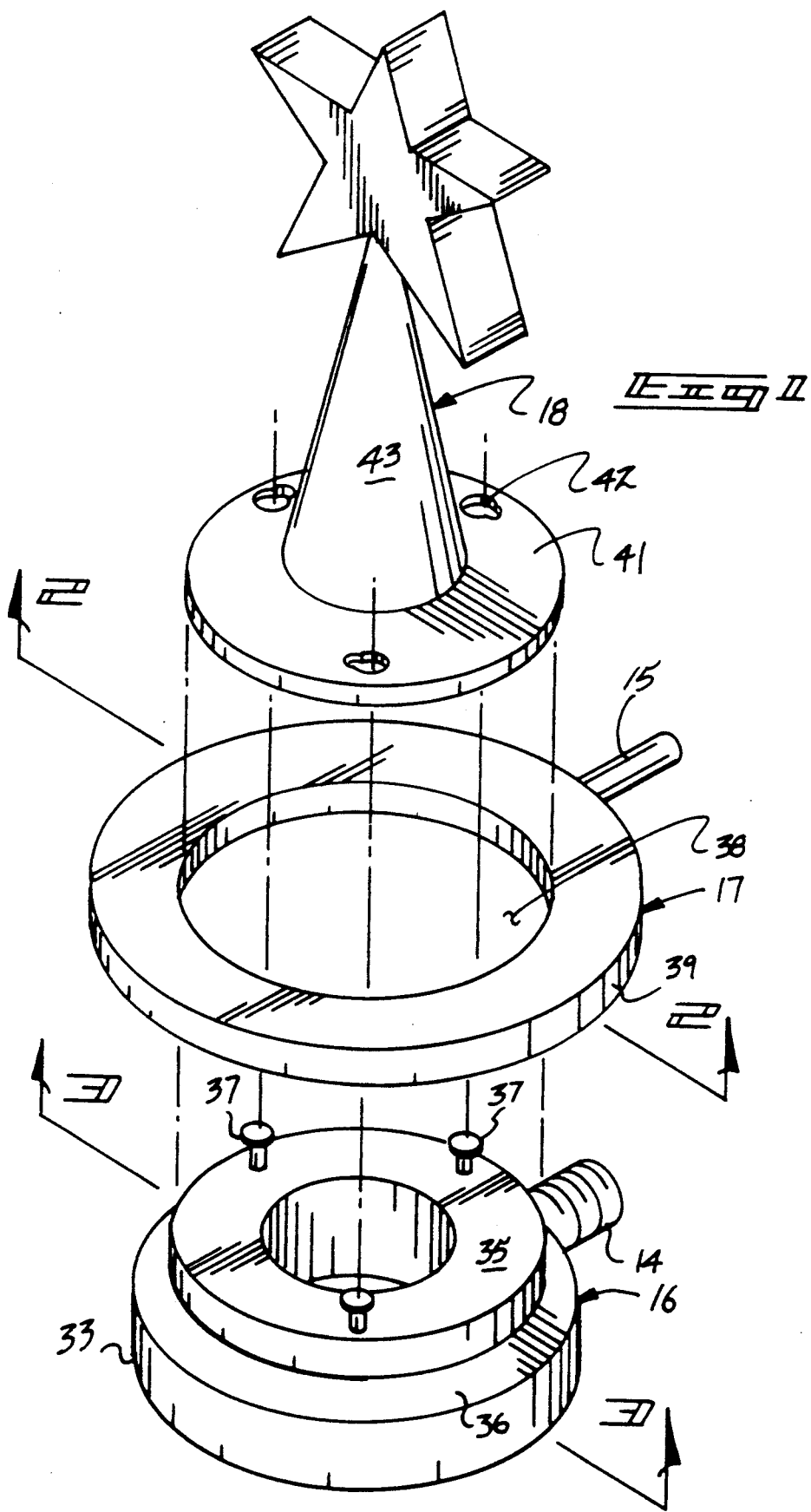

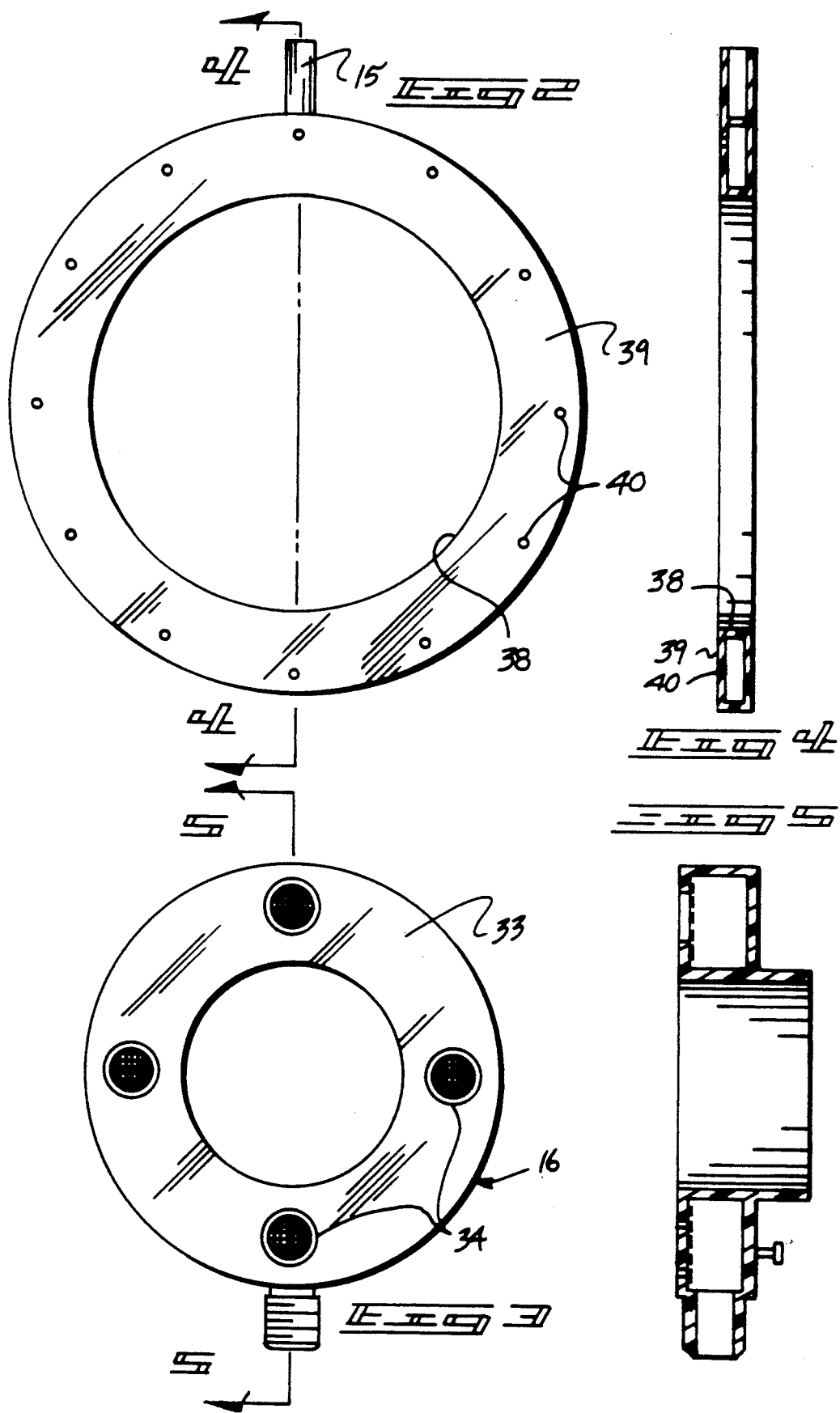

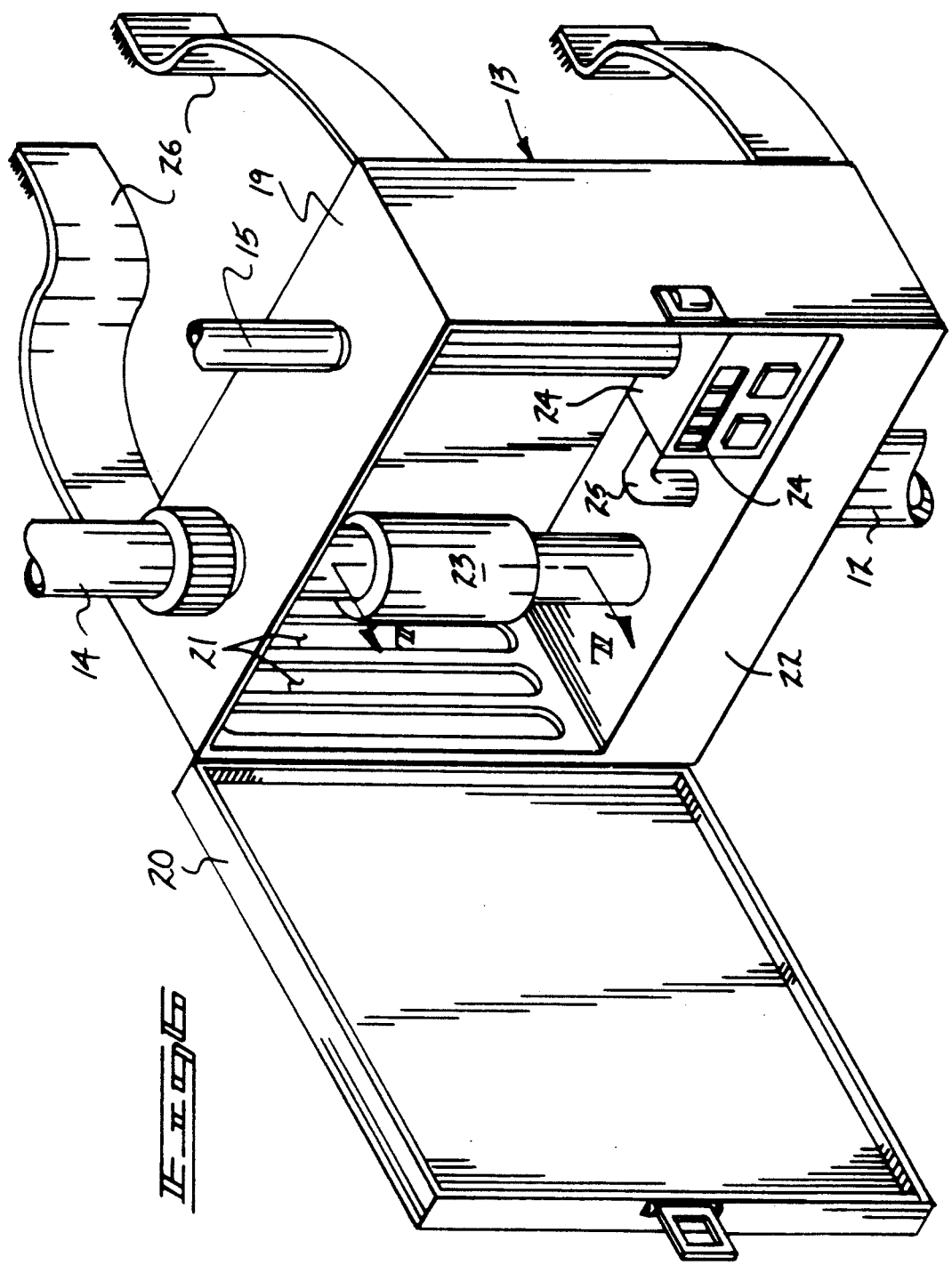

CHRISTMAS TREE WATERING APPARATUS

BACKGROUND OF THE INVENTION

1. Field of the Invention

The field of invention relates to Christmas tree watering apparatus, and more particularly pertains to a new and improved Christmas Tree watering apparatus wherein the same provides for the selective fluid flow of water into a tree to enhance its preservation during use, with a secondary fluid flow into the apparatus to provide for actuation upon sensing of elevated temperatures, such as during a fire of the tree.

2. Description of the Prior Art

Christmas tree watering apparatus of various types have been utilized in the prior art in typical preservation of the Christmas tree and such is exemplified in U.S. Pat. No. 4,993,176 to Spinosa wherein a basic fluid basin is arranged to provide for fluid flow and replenishment of the basin for use by a tree mounted into the basin.

U.S. Pat. No. 4,825,587 to Stancio sets forth a Christmas tree irrigation to direct fluid flow to an underlying support stand of a Christmas tree, as is also typified in U.S. Pat. No. 4,930,252 to Krausc.

The providing of water to a Christmas tree stand is typical in the prior art as is also noted in the U.S. Pat. No. 3,562,951 to Schwaderlapp.

Accordingly, it may be appreciated that there continues to be a need for a new and improved Christmas tree watering apparatus as set forth in the instant invention which addresses both the problems of ease of use as well as effectiveness in construction in providing for fluid flow onto an outer surface of a Christmas tree and in this respect, the present invention substantially fulfills this need.

SUMMARY OF THE INVENTION

In view of the foregoing disadvantages inherent in the known types of Christmas tree watering apparatus now present in the prior art, the present invention provides a Christmas tree watering apparatus wherein the same provides for selective misting and/or dousing of an associated Christmas tree in sensing of a fire thereto. As such, the general purpose of the present invention, which will be described subsequently in greater detail, is to provide a new and improved Christmas tree watering apparatus which has all the advantages of the prior art Christmas tree watering apparatus and none of the disadvantages.

To attain this, the present invention provides a Christmas tree fluid control housing including a first valve and second valve in communication with a first conduit, wherein the first valve selectively directs water flow to a sprinkling ring mounted adjacent an upper distal end of an associated Christmas tree, with a misting ring mounted in surrounding relationship relative to the sprinkling ring operative through a timer mechanism within the fluid control housing.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the Public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved Christmas tree watering apparatus which has all the advantages of the prior art Christmas tree watering apparatus and none of the disadvantages.

It is another object of the present invention to provide a new and improved Christmas tree watering apparatus which may be easily and efficiently manufactured and marketed.

It is a further object of the present invention to provide a new and improved Christmas tree watering apparatus which is of a durable and reliable construction.

An even further object of the present invention is to provide a new and improved Christmas tree watering apparatus which is susceptible to low cost of manufacture with regard to both materials and labor, and which accordingly is then susceptible to low prices of sale to the consuming public, thereby making such Christmas tree watering apparatus economically available to the buying public.

Still yet another object of the present invention is to provide a new and improved Christmas tree watering apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the ring fixing head, as well as the misting and sprinkling rings utilized by the invention.

FIG. 2 is an orthographic view, taken along the lines 2—2 of FIG. 1 in the direction indicated by the arrows.

FIG. 3 is an orthographic view, taken along the lines 3—3 of FIG. 1 in the direction indicated by the arrows.

FIG. 4 is an orthographic view, taken along the lines 4—4 of FIG. 2 in the direction indicated by the arrows.

FIG. 5 is an orthographic view, taken along the lines 5—5 of FIG. 3 in the direction indicated by the arrows.

FIG. 6 is an isometric illustration of the fluid control housing of the invention.

DESCRIPTION OF THE PREFERRED EMBODIMENT

Figure 8:
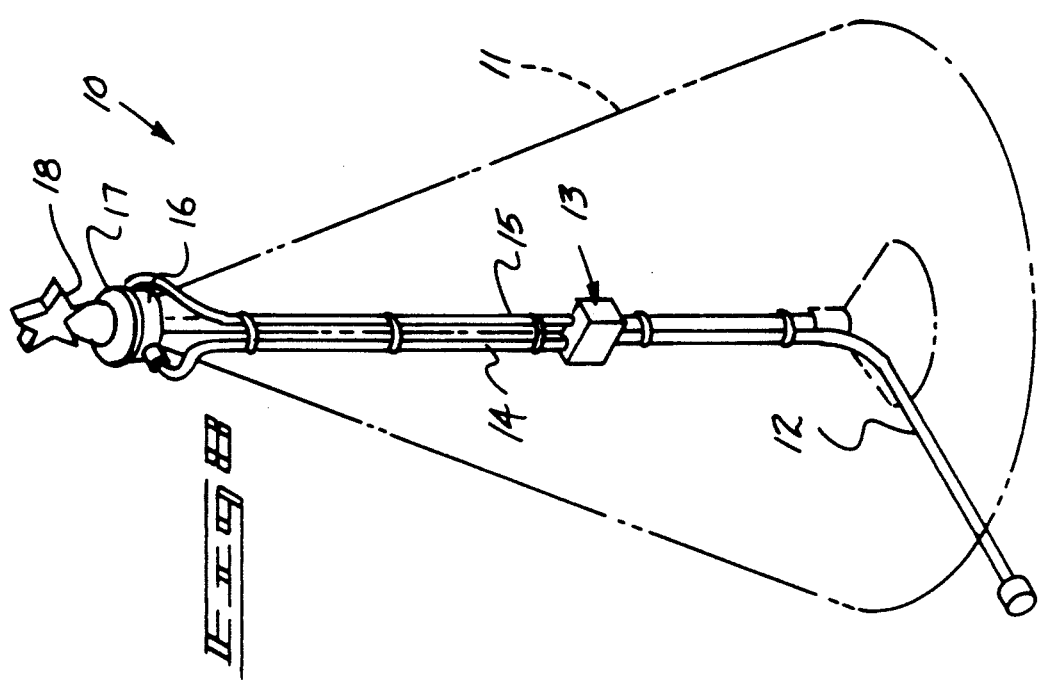
FIG. 8 is an isometric illustration of the invention in an assembled configuration.

With reference now to the drawings, and in particular to FIGS. 1 to 8 thereof, a new and improved Christmas tree watering apparatus embodying the principles and concepts of the present invention and generally designated by the reference numeral 10 will be described.

More specifically, the Christmas tree watering apparatus 10 of the instant invention essentially comprises the apparatus mounted to a Christmas tree 11, and more specifically with a fluid container 12 directed into a fluid control housing 13. A third fluid conduit 14 and a fourth conduit 15 are directed from the fluid control housing in fluid communication with the first fluid conduit 12 by way of a heat sensitive fluid valve 23 and a timer fluid valve 24 (see FIG. 6). The respective third and fourth fluid conduits 14 and 15 are directed into respective torroidal fluid sprinkling and misting rings 16 and 17 respectively. A ring fixing head 18 assembles the sprinkling and misting rings 16 and 17 in a fixed communication together to mount the sprinkling and misting rings 16 and 17, as well as the head 18, to an upper distal end of an associated Christmas tree 11.

Figure 7:
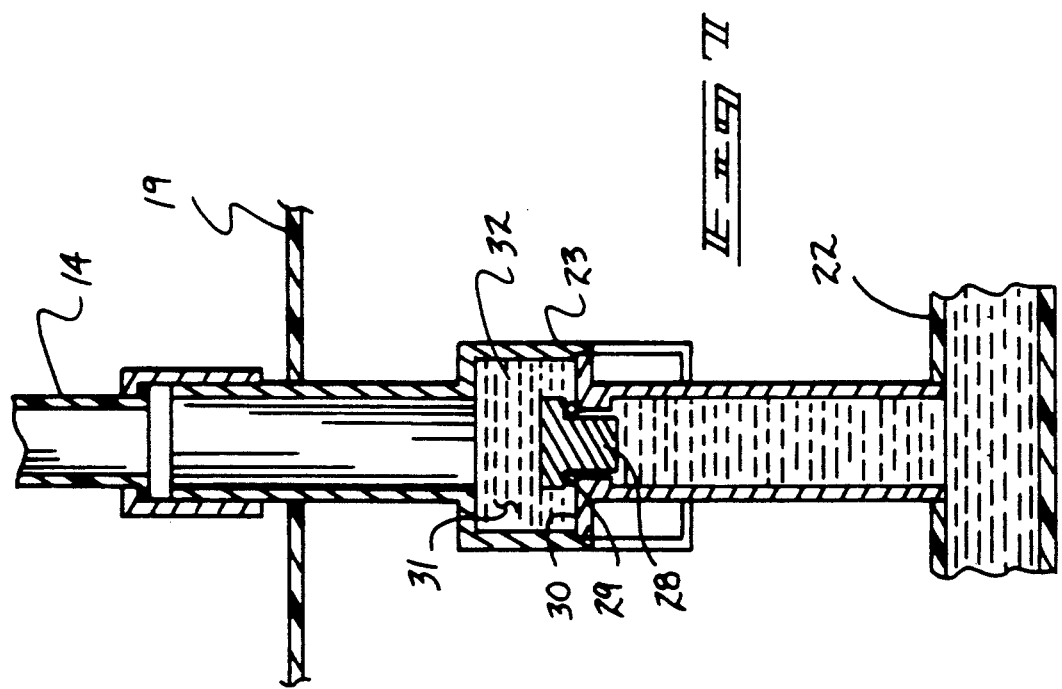
FIG. 7 is an orthographic view, taken along the lines 7—7 of FIG. 6 in the direction indicated by the arrows.

The fluid control housing 13 includes a container 19 having a container door 20 pivotally mounted thereto for access interiorly of the container. The first fluid conduit 12 is directed to a floor of the container into a container fluid chamber 22. The fluid chamber 22 directs fluid into the third and fourth fluid containers 14 and 15 respectively by way of a heat sensitive fluid valve 23 and a timer fluid valve 24 respectively The heat sensitive fluid valve 23 is mounted within the container 19 adjacent slots 21 through a side wall of the container to permit sensitivity of the heat sensitive valve 23 accessed to potential elevated temperatures within the Christmas tree organization. Reference to FIG. 7 illustrates that the heat sensitive valve mounted within the third fluid conduit 14 includes a fluid plug mounted within the valve housing overlying the valve housing floor, with an "O" ring 29 positioned between the T-shaped plug 28 onto the valve housing floor 30 within the valve housing cavity 31. A wax filler 32 is mounted coextensively through the valve housing cavity 31 to maintain the T-shaped plug 28 through the floor. Upon elevated temperatures, the wax 32 is melted permitting displacement of the T-shaped plug 28 relative to the third floor conduit between the heat sensitive valve 23 and the fluid chamber 22 permitting fluid flow through the third fluid conduit 14 into the sprinkling ring 16.

The timer fluid valve 24 utilizes a clock timer mechanism 24a to provide for selective fluid flow into the fourth fluid conduit 24. A connecting second conduit 25 effects fluid communication between the fluid chamber 22 and the fourth fluid conduit 15. Further, periodic misting of the Christmas tree 11 is effected by directing fluid through the misting ring 17 in fluid communication with the fourth fluid conduit 15.

The FIGS. 1, 3, and 5 illustrate the sprinkling ring having a sprinkling ring bottom wall 33, including a sprinkling ring bottom wall plurality of outlet ports 34 of a first diameter projecting through the sprinkler ring bottom wall 33. The outlet ports 34 overlie the Christmas tree 11. The sprinkler ring 16 includes a sprinkler ring top wall 36, with a sprinkler ring top wall cylindrical boss 35 projecting upwardly of the sprinkler ring top wall 36. The cylindrical boss 35 includes a plurality of cylindrical boss T-shaped head pins orthogonally mounted projecting upwardly of the cylindrical boss 35. The cylindrical boss 35 is defined by a predetermined boss diameter less than the outer diameter of the sprinkler ring 16. The spray outlet ports 34 are defined by a first diameter.

The misting ring 17 includes a misting ring central opening 38 equal to the boss diameter to complementarily receive the cylindrical boss 35 therethrough. The cylindrical boss 35 is of a predetermined height equal to the predetermined thickness of the misting ring 38, and wherein the misting ring is of a diameter greater than the sprinkler ring diameter to extend beyond the sprinkler ring to position the misting ring fluid openings 40 of a second diameter less than the first diameter beyond the sprinkler ring to provide for misting of the Christmas tree. The FIG. 2 notes the misting ring fluid openings 40 directed through the misting ring bottom wall 39.

The ring fixing head 18 includes a latch plate 41 having latch plate key hole openings 42 to receive the cylindrical boss T-shaped head pins 37 therethrough to latch the head pins to the latch plate 41 upon rotation of the latch plate relative to the pins 30 upon projection of the pins through the key hole openings. A hollow conical positioning head 43 is positioned concentrically of and projecting above the latch plate 41 to receive the upper distal end of the Christmas tree therewithin to position the sprinkling ring 16, the misting ring 17, and the ring fixing head 18 to the upper distal end portion of the associated Christmas tree 11.

It should be further noted that mounting straps 26 are arranged for securement to a rear wall of the fluid control housing 13 for securement to the Christmas tree structure and may be arranged to include various fastener members such as hook and loop fastener structure, snaps, and the like for such securement. The fluid conduits 12, 14, and 15 may be formed of rigid or flexible connections, wherein conventional couplings for quick fluid connection of the conduits to the fluid control housing may be provided as required.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A Christmas tree watering apparatus arranged for securement to a Christmas tree, comprising, a first fluid conduit, and a fluid control housing, the fluid control housing including a container fluid chamber, with the first fluid conduit directed into the container fluid chamber, and a torroidal fluid sprinkling ring arranged for mounting adjacent an upper distal end of the Christmas tree, including a sprinkling ring conduit in fluid communication with the sprinkling ring and the container fluid chamber, and first valve means for effecting selective fluid flow between the container fluid chamber and the sprinkling ring, with the first valve means mounted within the sprinkling ring conduit, and a torroidal fluid misting ring mounted onto the sprinkling ring extending laterally beyond the sprinkling ring, with a misting ring conduit in fluid communication between the misting ring and the container fluid chamber, and second valve means mounted within the misting ring conduit for permitting selective fluid flow through the misting ring conduit between the container fluid chamber and the misting ring, and the container housing includes a plurality of openings directed through the container, with the first valve means positioned adjacent the openings, and the first valve means including a valve housing, the valve housing including a valve housing floor positioned below a valve housing cavity, and a T-shaped plug directed through the valve housing floor into the sprinkling ring conduit, and wax coextensively contained within the valve housing cavity over the T-shaped plug, whereupon elevated temperature effects melting of the wax and permits removal of the T-shaped plug relative to the sprinkling ring conduit directing fluid flow through the first valve means into the sprinkling ring.

2. An apparatus as set forth in claim 1 wherein the sprinkling ring includes a sprinkling ring bottom wall, the sprinkling ring bottom wall including a plurality of spray outlet ports of a first diameter, the sprinkling ring including a sprinkling ring top wall and a sprinkling ring top wall cylindrical boss extending above the sprinkling ring top wall defining a ledge between the boss and an outer periphery of the sprinkling ring, and the misting ring received on the ledge, wherein the boss is of a predetermined height and the sprinkling ring is of a thickness equal to the predetermined height, and a plurality of T-shaped pins mounted on the sprinkling ring top wall, the misting ring including a plurality of misting ring openings directed through a misting ring bottom wall, wherein the misting ring openings ar positioned exteriorly of the sprinkling ring, and a latch plate, the latch plate including a plurality of latch plate key hole openings, and each key hole opening of said key hole openings receives one of said pins, whereupon rotation of the latch plate effects securement of the pins within the openings.

3. An apparatus as set forth in claim 2 including a conical positioning head mounted medially of the latch plate extending thereabove, wherein the conical positioning head is hollow to permit selective reception of an upper distal end of the Christmas tree therewithin.

4. An apparatus as set forth in claim 3 wherein the second valve means includes a second fluid conduit in communication between the second valve means and the container fluid chamber, the second valve means including a timer mechanism to permit selective opening of the valve means permitting fluid flow between the second conduit and the misting ring conduit.

5. An apparatus as set forth in claim 4 including strap means for securement of the fluid control housing to the Christmas tree.

* * * * *